US009015583B2

(12) United States Patent
Egusa

(10) Patent No.: US 9,015,583 B2
(45) Date of Patent: *Apr. 21, 2015

(54) EDITING APPARATUS AND AN EDITING METHOD

(71) Applicant: GVBB Holdings S.A.R.L., Luxembourg (LU)

(72) Inventor: Toshifumi Egusa, Luxembourg (LU)

(73) Assignee: GVBB Holdings S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,188

(22) Filed: Sep. 8, 2014

(65) Prior Publication Data

US 2015/0012823 A1    Jan. 8, 2015

Related U.S. Application Data

(63) Continuation of application No. 12/450,794, filed as application No. PCT/JP2007/001041 on Sep. 26, 2007, now Pat. No. 8,898,563.

(30) Foreign Application Priority Data

Apr. 13, 2007   (JP) .................................. 2007-106438

(51) Int. Cl.
*G06F 17/21* (2006.01)
*G06F 3/0484* (2013.01)
(Continued)

(52) U.S. Cl.
CPC .......... *G06F 3/04842* (2013.01); *G11B 27/034* (2013.01); *G11B 27/34* (2013.01); *G06F 3/0481* (2013.01); *G06F 17/30126* (2013.01)

(58) Field of Classification Search
USPC .......................................................... 715/255
See application file for complete search history.

(56) References Cited

U.S. PATENT DOCUMENTS 6,172,993 B1   1/2001  Kim et al.
6,678,332 B1 * 1/2004  Gardere et al. .......... 375/240.26
(Continued)

FOREIGN PATENT DOCUMENTS

EP    1170747    1/2002
EP    1580754    9/2005
(Continued)

OTHER PUBLICATIONS

Lin, Ching-Yung, Belle L. Tseng, and John R. Smith. "Universal mpeg content access using compressed-domain system stream editing techniques." In Multimedia and Expo, 2002. ICEM'02. Proceedings. 2002 IEEE International Conference on, vol. 2, pp. 73-76. IEEE, 2002.*

(Continued)

*Primary Examiner* — Frank D Mills
(74) *Attorney, Agent, or Firm* — Arent Fox LLP

(57) ABSTRACT

Editing apparatus and an editing method for editing a plurality of files, which are recorded on a storage part and correspond to one shot. The editing method includes a determination step determining a generation order in time sequence of a plurality of files which correspond to one shot and include interframe coded data; and an integration step S12 of arranging the plurality of files in the generation order and integrating the arranged files. The editing method may further include a displaying step of displaying one clip corresponding to the integrated files, and editing step editing the clip.

20 Claims, 11 Drawing Sheets

(51) Int. Cl.
| | | |
|---|---|---|
| G11B 27/034 | (2006.01) | |
| G11B 27/34 | (2006.01) | |
| G06F 3/0481 | (2013.01) | |
| G06F 17/30 | (2006.01) | |

(56) References Cited

U.S. PATENT DOCUMENTS

| | | | |
|---|---|---|---|
| 6,754,663 B1* | 6/2004 | Small et al. | 1/1 |
| 7,174,561 B2* | 2/2007 | Bixby et al. | 725/93 |
| 7,325,199 B1* | 1/2008 | Reid | 715/723 |
| 7,786,999 B1* | 8/2010 | Reid | 345/581 |
| 7,805,678 B1* | 9/2010 | Niles et al. | 715/716 |
| 7,890,867 B1* | 2/2011 | Margulis | 715/723 |
| 8,391,410 B2 | 3/2013 | Wang | |
| 2001/0036356 A1* | 11/2001 | Weaver et al. | 386/52 |
| 2002/0168181 A1* | 11/2002 | Hsiao et al. | 386/124 |
| 2002/0172281 A1* | 11/2002 | Mantchala et al. | 375/240.12 |
| 2003/0034997 A1* | 2/2003 | McKain et al. | 345/723 |
| 2003/0206596 A1* | 11/2003 | Carver et al. | 375/240.26 |
| 2003/0210898 A1* | 11/2003 | Juen et al. | 386/117 |
| 2003/0215214 A1* | 11/2003 | Ma | 386/52 |
| 2005/0002283 A1* | 1/2005 | Suzuki | 369/30.08 |
| 2005/0074227 A1* | 4/2005 | Jung et al. | 386/95 |
| 2005/0237865 A1* | 10/2005 | Ando et al. | 369/30.3 |
| 2005/0256967 A1* | 11/2005 | Winter | 709/231 |
| 2005/0257152 A1* | 11/2005 | Shimizu et al. | 715/723 |
| 2006/0008247 A1* | 1/2006 | Minami et al. | 386/52 |
| 2006/0203920 A1* | 9/2006 | Yongfang et al. | 375/240.28 |
| 2006/0239656 A1* | 10/2006 | Lin et al. | 386/112 |
| 2006/0265426 A1* | 11/2006 | Chen | 707/200 |
| 2006/0271855 A1* | 11/2006 | Patten et al. | 715/723 |
| 2007/0140358 A1* | 6/2007 | Schwartz et al. | 375/240.26 |
| 2007/0162571 A1* | 7/2007 | Gupta et al. | 709/219 |
| 2007/0192697 A1* | 8/2007 | Kawamura et al. | 715/716 |
| 2007/0206676 A1* | 9/2007 | Yamazaki | 375/240.12 |
| 2008/0019444 A1* | 1/2008 | Fuchie et al. | 375/240.12 |
| 2008/0044155 A1* | 2/2008 | Kuspa | 386/52 |
| 2008/0046614 A1* | 2/2008 | Aridome et al. | 710/65 |
| 2008/0063387 A1* | 3/2008 | Yahata et al. | 386/126 |
| 2008/0069539 A1* | 3/2008 | Oh | 386/109 |
| 2008/0229373 A1* | 9/2008 | Ma et al. | 725/92 |

FOREIGN PATENT DOCUMENTS

| | | |
|---|---|---|
| EP | 1624457 | 2/2006 |
| JP | 2003217266 A | 7/2003 |
| JP | 2004226721 A | 8/2004 |
| JP | 2005309503 A | 11/2005 |
| JP | 2006005885 A | 1/2006 |
| JP | 2006229674 A | 8/2006 |
| WO | 2006030767 A1 | 3/2006 |

OTHER PUBLICATIONS

English Translation of First Office Action dated Jan. 12, 2011, regarding Chinese Application No. CN200780053314.6.
English Translation of Second Office Action, dated Jul. 27, 2011, regarding Chinese Application No. CN200780053314.6.
Decision to Reject Amendment dated Apr. 1, 2014 regarding Japanese Patent Application No. JP2009-544076.
Communication from European Patent Office dated Dec. 20, 2010 regarding Patent Application No. EP07827820.7.
PCT Publication No. WO2008/126157 dated Oct. 23, 2008 regarding PCT Application No. PCT/JP2007/001041 (with patent citation JP2004226721A referenced on p. 1 of Publication).
International Preliminary Report on Patentability dated Oct. 13, 2009 with Written Opinion regarding Application No. PCT/JP2007/001041.
Rejection Decision dated Apr. 1, 2014 regarding Patent Application No. JP2009-544076.
Office Action in Japanese Application No. 2009-544076, dispatched Jul. 30, 2013.
Lin, Ching-Yung, Belle L. Tseng, and John R. Smith. "Universal mpeg content access using compressed-domain system stream editing techniques." In Multimedia and Expo, 2002. ICME'02. Proceedings. 2002 IEEE International Conference on, vol. 2, pp. 73-76. IEEE, 2002.
Office Action in Japanese Application No. 2009-544076 dispatched Aug. 7, 2012.
Abstract of JP 2006005885 dated Jan. 5, 2006.
Abstract of JP 2003217266 dated Jul. 31, 2003.
Abstract of JP 2005309503 dated Nov. 4, 2005.
Abstract of WO 2006030767 dated Mar. 23, 2006.
International Search Report dated Feb. 5, 2008 regarding PCT/JP2007/001041.
European Office Action dated Jan. 16, 2015 regarding EP Application No. EP07827820.7.

* cited by examiner

Fig. 5

| 103COMF. IDX |
|:---:|
| 4 |
| 00 : 17 : 15 : 06 |
| 00 : 17 : 15 : 06 |
| 00 : 17 : 15 : 06 |
| 00 : 08 : 05 : 09 |

EDITING APPARATUS AND AN EDITING METHOD

CROSS-REFERENCE TO RELATED APPLICATIONS

This application is a continuation of U.S. patent application Ser. No. 12/450,794, entitled "EDITING APPARATUS AND AN EDITING METHOD," filed Oct. 13, 2009, which is based upon and claims the benefit of priority under 35 U.S.C. 365 of International Application No. PCT/JP2007/001041, filed Sep. 26, 2007, which was published in accordance with PCT Article 21(2) on Oct. 23, 2008 in English and which claims the benefit of priority of Japanese patent application No. 2007-106438, the teachings of each which are incorporated by reference herein.

TECHNICAL FIELD

The present invention relates to an editing apparatus and an editing method. More specifically, the present invention relates to an editing apparatus and an editing method for editing video data and/or audio data stored in a storage device.

BACKGROUND ART

In recent years, a random-accessible and high-density storage medium such as an optical disk, an opt-magnetic disk and a semiconductor memory is often adapted for use as a storage medium in a video camera. Usually, video data and/or audio data stored in such storage medium are either transmitted to a storage device such as a Hard Disk Drive ("HDD" hereinafter) in an editing devise, or is read out from the storage medium itself for editing as disclosed in the Patent Citation 1.

However, a data corresponding to one shot whose definition is a record of shooting from the beginning to the end is difficult to be written onto the storage medium as one file. This is because a file system on the storage medium limits the maximum file size of one file to be written onto the storage medium. Therefore, data corresponding to one shot is usually recorded and stored as a plurality of files in the storage medium, particularly when the data size for one shot is over the limit of the maximum file size.

On the other hand, a file system whereby the maximum file size is large enough to accommodate the data corresponding to one shot can store the data corresponding to one shot as one single file. Nevertheless since a file system of such kind normally has a complex structure and performs a complicated process associated with such a structure, it is often designed for a specific Operating System ("OS" herein after). In other words, a file system that can utilize any conventional OS and accommodate one shot as one file is not available yet. In addition, it is usually considered as desirable that the data in the storage medium to be recorded in a format which can be read out in any ordinary OS to enable editors to use any kind of OS to edit the data. This is the main reason why a file system whose data is readable by ordinary OS is being adapted for a storage medium despite its maximum size not being large enough to accommodate a data corresponding to one shot.

Patent Citation 1: Japanese Laid Open Patent No. 2004-266721

DISCLOSURE OF INVENTION

Technical Problem

This conventional method, however, causes deterioration of images at a connection point between two divided files that are in line with the time sequence and are interframe coded when editing video data corresponding to one shot stored in a plurality of files. Moreover, there can be inter-frame references between frames around the connection point when conventional interframe coding is applied. This also causes the deterioration of images at connection points because a normal inter-frame reference cannot be performed properly.

Therefore, it is an object of the present invention to provide a new and advantageous editing apparatus and an editing method that enables integration of a plurality of files corresponding to one shot without deteriorating images, so that processing of the plurality of files becomes easy and effective.

Technical Solution

A first aspect of the present invention provides an editing apparatus including a determination unit and an integration unit. The determination unit determines a generation order in time sequence of each of a plurality of files. The plurality of files are stored in a storage part, correspond to one shot, and include interframe coded data. The integration unit arranges the plurality of files in the generation order and integrate the arranged files.

According to the present invention, deterioration of images at connecting points can be avoided as two files are connected in line with the generation order along the time sequence. Furthermore, one shot divided into a plurality of files is recognized as one virtual clip thereby enabling a user of the editing apparatus according to the present invention to edit the clip without being concerned about the generation order of the plurality of files and positions of video material such as whereabouts of certain scenes among the plurality of files.

In understanding the scope of the present invention, the term "a shot" as used herein and in claims to mean a unit for a record of shooting one scene that is consecutively in line with the time sequence. As defined at the beginning, one shot is a scene or a shooting of a scene from its beginning to the end. Similarly, the term "a clip" is used to indicate information that refers to a part or all of video material with a time axis, and includes a starting point and ending point of the referred material. In other words, one clip may refer to all of video material corresponding to one shot or it may refer to only a part of video material corresponding to one shot. The data referred by a clip may be video material, audio material, and/or text material.

Another aspect of the present invention provides an editing method including the following steps of determining a generation order in time sequence of each of a plurality of files, and integrating the plurality of files by arranging the plurality of files in the generation order. The plurality of files are stored in a storage part, correspond to one shot, and include interframe coded data.

This method performs the same effect as the apparatus mentioned above.

Advantageous Effect

The present invention provides a new and advantageous editing apparatus and an editing method that enables integration of a plurality of files corresponding to one shot without deteriorating images, so that processing of the plurality of files becomes easy and effective.

BRIEF DESCRIPTION OF THE DRAWINGS

FIG. 5 is an explanatory view of an index file.

EXPLANATION OF REFERENCE

Figure 1:
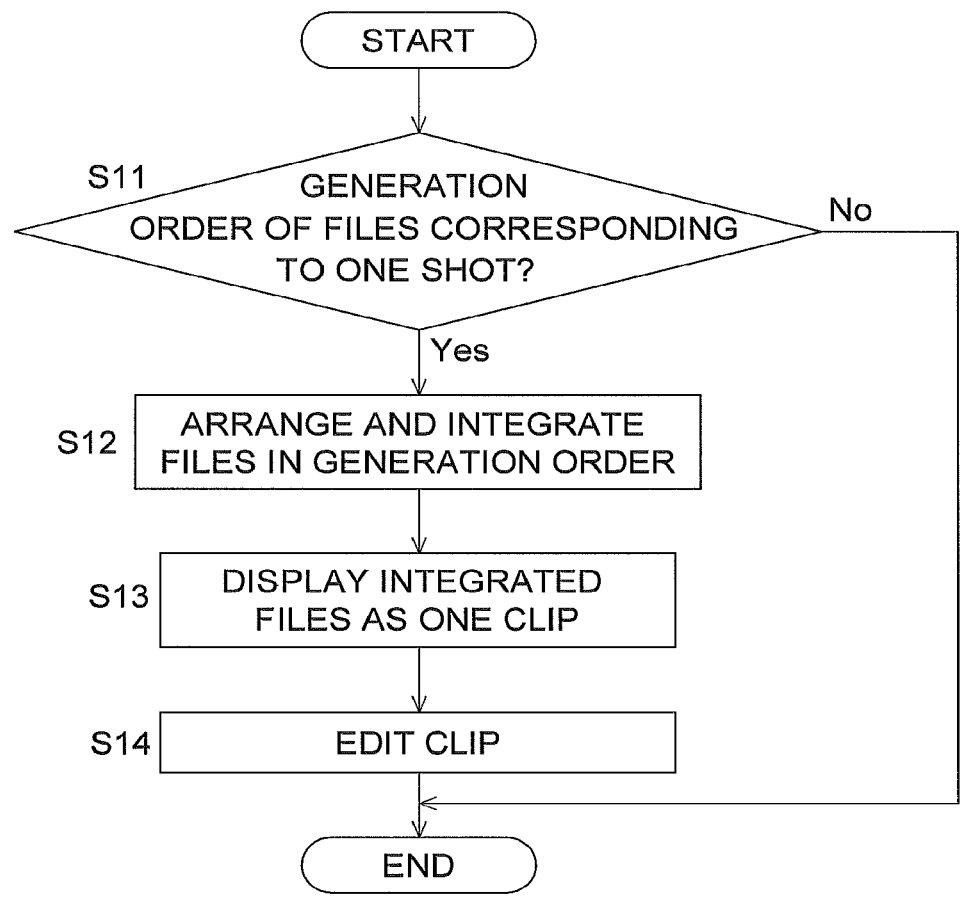
FIG. 1 is a flowchart showing an editing method in accordance with the present invention.

100: Editing apparatus
200: Operation unit
202: Determination unit
203: Integration unit
204: Designation acceptance unit
300: Output device

BEST MODE FOR CARRYING OUT THE INVENTION

<Overview of the Invention>

An editing apparatus of the present invention is implemented by a conventional computer such as a laptop and a desktop. Editing work of video data is performed as the following. An editor designates an access-destination resource of a file and the file to be read. A clip corresponding to the designated file to be read is listed in a video material window such as a Bin window on a display. One clip corresponding to a plurality of files is displayed in the video material window when the plurality of files corresponding to one shot are designated to be read.

The editor selects a clip from the video material window and arranges the clip on a track displayed in a timeline window. The plurality of files corresponding to one shot is displayed in the form of one clip even on the track. Therefore, this enables the editor to drag one clip corresponding to one shot which is divided into and recorded in the plurality of files, drop the clip on the timeline, and edit the clip.

FIG. 1 is a flowchart showing an editing method in accordance with the present invention. In this editing method illustrated in FIG. 1, a generation order in time sequence of each of a plurality of files that correspond to one shot stored in a storage part is determined first (step S11). The plurality of files are arranged in the generation order and integrated (step S12) when obtaining the generation order in time sequence of each of the plurality of files corresponding to the shot (in the case of "Yes" in step S11). This enables to edit the plurality of files corresponding to one shot as one clip. Then, one clip corresponding to the integrated files is displayed (step S13) and is edited (step S14).

This process ends when the plurality of files corresponding to one shot is not stored in the storage part (in the case of "No" in step S11).

The order of step S13 and step S14 may be determined as necessary. In addition, step S13 and step S14 are optional. For example, a copy of the clip may be created or the clip may be outputted at step S14 without editing the clip.

First Embodiment

<<Hardware Configuration of the Editing Apparatus>>

Figure 2:
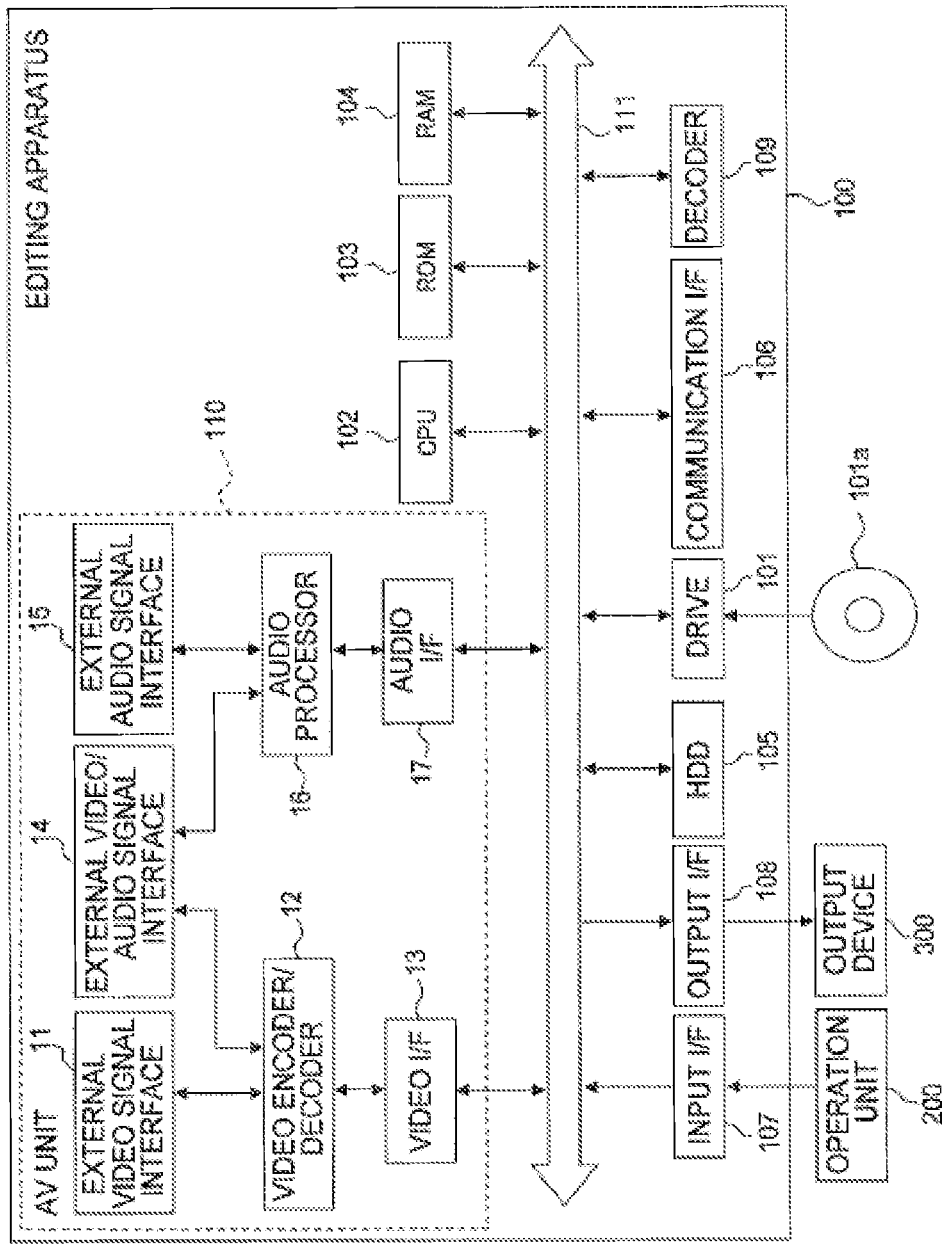
FIG. 2 is an example of a hardware diagram of the editing apparatus in accordance with a first embodiment of the present invention.

FIG. 2 is an example of a hardware diagram of the editing apparatus 100 in accordance with a first embodiment of the present invention. With reference to FIG. 2, the editing apparatus 100 includes a drive 101, a CPU 102, a ROM 103, a RAM 104, a hard disk drive (HDD) 105, a communication interface 106, an input interface 107, an output interface 108, a decoder 109, an AV unit 110, and a BUS 111 that connects the above-mentioned elements. The AV unit 110 is an element to exchange video signals between an external device and the editing apparatus 100, and is an optional element of the editing apparatus 100.

A removable medium 101a such as an optical disk is inserted into the drive 101. A file is read out from the removable medium 101a. Although FIG. 2 shows that the editing apparatus 100 has the built-in drive 101, the drive 101 may be an external drive. Other examples of a removable medium 101a are a magnetic disk, an optical-magnetic disk, Blu-ray disk, or a semiconductor memory other than an optical disk.

The CPU 102 controls the entire operation of the editing apparatus 100 by executing a control program stored in the ROM 103. For example, the CPU 102 controls each part of the drive 101 so as to read out a file stored in the removable medium 101a and write the file onto the RAM 104 or the HDD 105.

The HDD 105 stores video material, which is read out from the removable medium 101a and is sent to the HDD 105 through the BUS 111.

The communication interface (I/F in FIG. 2) 106 communicates with a video camera via a USB (Universal Serial Bus), and receives data stored on a storage medium inside the video camera. The communication interface 106 may further send generated video contents to a resource on a network. Audio contents may be generated in addition to or instead of video contents.

The input interface (I/F in FIG. 2) 107 accepts a user operation on an operation unit 200 such as a keyboard and a mouse, and sends an operational signal to the CPU 102 via the BUS 111.

The output interface (I/F in FIG. 2) 108 sends video data and/or audio data received from the CPU 102 to an output device 300 such as an LCD (liquid crystal display) and a speaker.

The decoder 109 decodes encoded video data and sends the decoded data to the BUS 111. The encoded data is sent to the decoder 109 from the drive 101 and/or the communication interface 106 through the BUS 111. The encoded data may be intraframe coded data such as DV data and interframe coded data such as MPEG data. The decoder 109 may be implemented by software.

The AV unit 110 includes the following elements and functions (a) to (g).

(a) An external video signal interface 11 relays video signals such as analog composite signals, analog component signals, digital component signals between an external device of the editing apparatus and a video encoder/decoder 12.

(b) The video encoder/decoder 12 decodes video data received through the video interface 13, converts the decoded video data into analog video signals, and outputs the converted video signals to the external video signal interface 11.

Where necessary, the video encoder/decoder 12 may convert video signals that are sent from the external video signal interface 11 and/or an external video/audio interface 14 into digital data. The video encoder/decoder 12 then compresses and encodes the converted digital data by using MPEG (Moving Picture Experts Group) 2 method, and outputs the obtained data to the BUS 111 via the video interface 13.

(c) The video interface 13 relays data between the video encoder/decoder 12 and the BUS 111.

(d) The external video/audio signal interface 14 outputs video data and audio data, which are input from an external device, to the video encoder/decoder 12 and to an audio processor 16, respectively. The external video/audio signal interface 14 further externally outputs video data from the video encoder/decoder 12 and audio data from the audio processor 16. An example of the external video/audio signal interface 14 is an interface according to an SDI (serial digital interface).

(e) An external audio signal interface 15 relays audio signals between an external device and the audio processor 16. An example of the external audio signal interface 15 is an interface for analog-audio signals.

(f) The audio processor 16 converts audio signals received from the external audio signal interface 15 into analog data or digital data, and outputs the converted data to an audio interface 17. The audio processor 16 further converts audio data received from the audio interface 17 into digital signals or analog signals, adjusts the audio level, and outputs the obtained signals to the external audio signal interface 15.

(g) The audio interface 17 outputs data to the audio processor 16, and sends data received from the audio processor 16 to the BUS 111.

<<Functional Configuration of the Editing Apparatus>>

Figure 3:
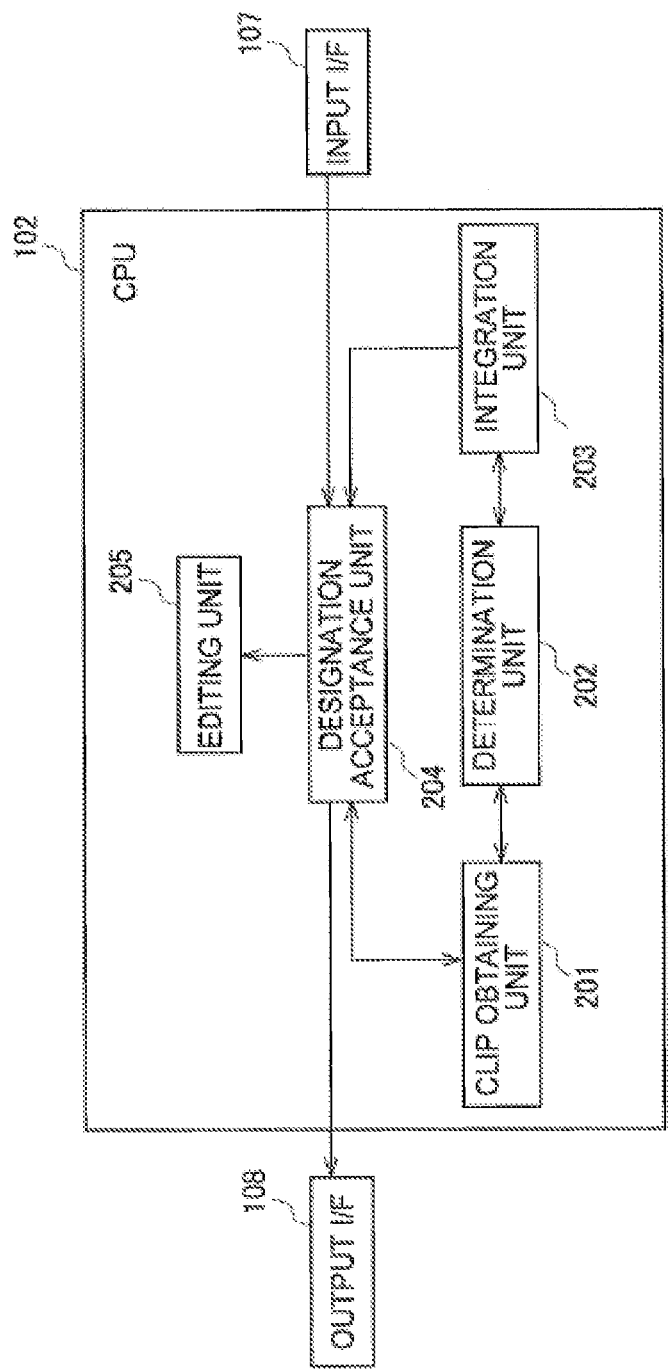
FIG. 3 is a block diagram showing a functional configuration of the editing apparatus.

FIG. 3 is a block diagram showing a functional configuration of the editing apparatus 100. With reference to FIG. 3 together with FIG. 2, the CPU 102 in the editing apparatus 100 includes a clip obtaining unit 201, a determination unit 202, an integration unit 203, a designation acceptance unit 204, and an editing unit 205. These units enable the CPU 102 to realize (1) file selection and obtaining function, (2) clip information generation function, (3) editing acceptance function, and (4) editing function. Each function of the editing apparatus 100 will be explained below.

(1) File Selection and Obtaining Selection

The CPU 102 reads out file-management data stored on an access-destination resource, and accepts the selection of a file. Video material in the selected file is read out from the access-destination resource, and written on the HDD 105. Examples of the access-destination resource are a removable medium 101a inserted in the drive 101, a storage medium which is accessible via the communication interface 108. Audio material may be read out from the selected file having audio data stored therein.

Figure 4:
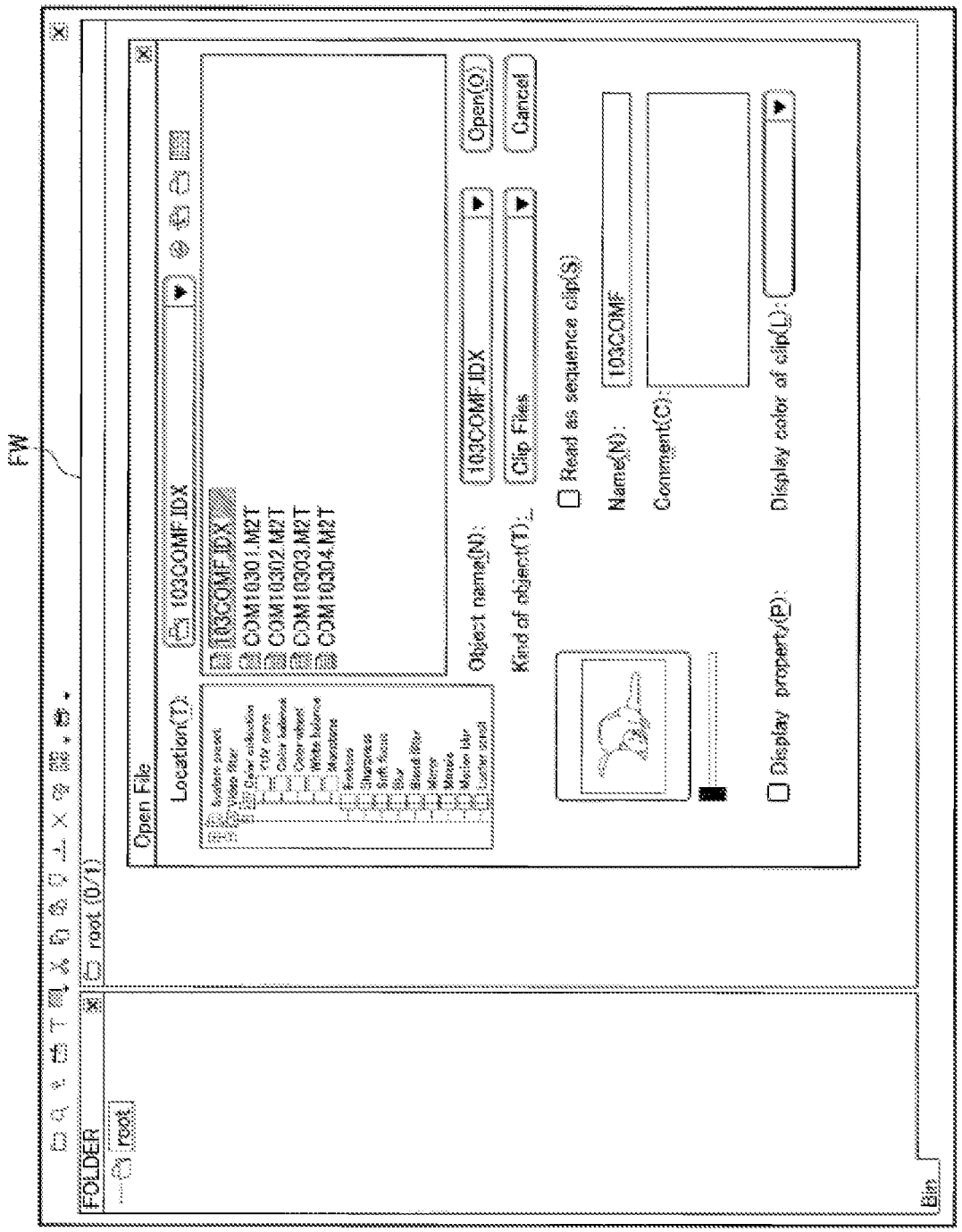
FIG. 4 shows an example of a file-selection window FW.

FIG. 4 shows an example of a file-selection window FW displayed by the designation acceptance unit 204. With reference to FIG. 4, this window accepts the selection of an access-destination resource. Management data of a file stored on the selected access-destination resource is read out by the clip obtaining unit 201. The management data is data for managing a file such as a filename, a recording time, a generation time, an author name, and data amount. The read-out management data is sent to the designation acceptance unit 204, and is displayed on the file selection window FW. FIG. 4 shows a state in which filenames are displayed as read-out management data, for example.

The file-selection window FW accepts the selection of a file. Video material in the selected file is read out from the selected access-destination resource by the clip obtaining unit 201, and is written on the HDD 105. The video material may be encoded video data, and may be compressed or uncompressed. The data to be read out from the selected access-destination resource may be audio material and/or text material in addition to or instead of video material.

The management data of the file selected on the file-selection window FW is sent to the determination unit 202, and used for executing the function explained below.

(2) Clip Information Generation Function (2-1) Example of Associating One Shot with Files The CPU 102 generates clip information in order to process a plurality of files as one clip when a plurality of files corresponding to one shot are selected on the file-selection window FW.

In order to simplify explanation, suppose that a plurality of files corresponding to one shot are associated with each other by filenames of each file and an index file. How to determine the generation order in time sequence of the plurality of files corresponding to one shot is not limited to the example explained here.

A filename of the plurality of files corresponding to one shot includes a "shot ID" and a "connection number". The "shot ID" specifies each shot and associates the plurality of files with one shot. The "connection number" indicates the order in which the plurality of files corresponding to each shot is to be played back. For example, the file-selection window FW in FIG. 4 displays four filenames "COM10301.M2T", "COM10302.M2T", "COM10303.M2T" and "COM10304.M2T". "COM" in the four filenames indicates a compression format in this case. Three numbers "103" following "COM" indicate a shot ID. Two numbers "01", "02", "03" and "04" following the shot ID indicate a connection number. When these four files are played back in order of the connection number, data recorded by the shot "103" can be played back in the order of recording of these four files.

FIG. 5 shows an explanatory view of an index file "103 COMF.IDX". With reference to FIG. 5, the index file shows an example of an index file relating to the four files displayed in the file-selection window FW in FIG. 4. One index file is generated for the plurality of files corresponding to one shot. A filename of the index file includes a "shot ID" and an extension "IDX" which indicates that the file is an index file. The index file and the plurality of files are associated with each other by the "shot ID". In this example, the filename of the index file further includes "COM" indicating a compression format.

"The number of files" and "time length of a file" are at least described in the index file. "The number of files" indicates the total number of the plurality of files corresponding to one shot. FIG. 5 shows that the total number of files is "4". The "time length of a file" is a time length necessary for playing back each file. In FIG. 5, the "time length of a file" of the four files are "00:17:15:06", "00:17:15:06", "00:17:15:06" and "00:08:05:09". Time information is described in the form of "hh:mm:ss:ff" in the present editing apparatus. "hh" indicates hour, "mm" indicates minute, "ss" indicates second, and "ff" indicates frame. Thirty frames correspond to one second.

"The total recording time" may be described in the index file instead of or in addition to "the number of files". "The total recording time" indicates the total of "the time length of a file" of each file. For example, a value of "the total recording time" for the index file illustrated in FIG. 5 is "00:59:50:27".

(2-2) Generation of Clip Information for One Clip Corresponding to a Plurality of Files The CPU 102 generates clip information for one clip corresponding to a plurality of files when the plurality of files selected in the file-selection window FW in FIG. 4 correspond to one shot. In this embodiment, the determination unit 202 determines whether or not an index file is selected. The integration unit 203 generates clip information for one clip when the index file was selected. The generated clip information is sent to the designation acceptance unit 204, and one clip is displayed based on this information. This means that one clip is displayed corresponding to one shot which is divided into and recorded in the plurality of files.

The clip information includes data which is necessary for displaying and editing one clip. A "clip name", an "in point", an "out point", a "read-out starting point", a "read-out ending point", and a "thumbnail image" are included in the clip information, for example. The "clip name" identifies each clip. The "in point" is time information indicating a starting time of a clip arranged on a timeline of video contents. The "out point" is time information indicating an ending time of a clip arranged on the timeline of the video contents. The "read-out starting point" is time information indicating a read-out starting address of video material which a clip refers to. The "read-out ending point" is time information indicating a read-out ending address of video material which a clip refers to. The read-out starting point and the read-out ending point are displayed as time information on a time axis when clip information is generated upon a selection of an index file. The time axis is defined by connecting each file described in the index file in time sequence. The "thumbnail image" is a still image that represents a clip.

More specifically, the integration unit 203 generates the clip information based on the management data received from the clip obtaining unit 201. The management data is for an index file and a plurality of files associated therewith. In this case, a "clip name" may be the filename of the index file. A default value of the "in point" may be "00:00:00:00". The "out point" may be the total recording time "00:59:50:27" which is the total of the time length of each file. The "read-out starting point" may be "00:00:00:00" which indicates the head of the first file. The "read-out ending point" may be "00:59:50:27" which indicates the end of the last file. The "thumbnail image" may be the first frame of the first file, or may be other frames as necessary.

Figure 6:
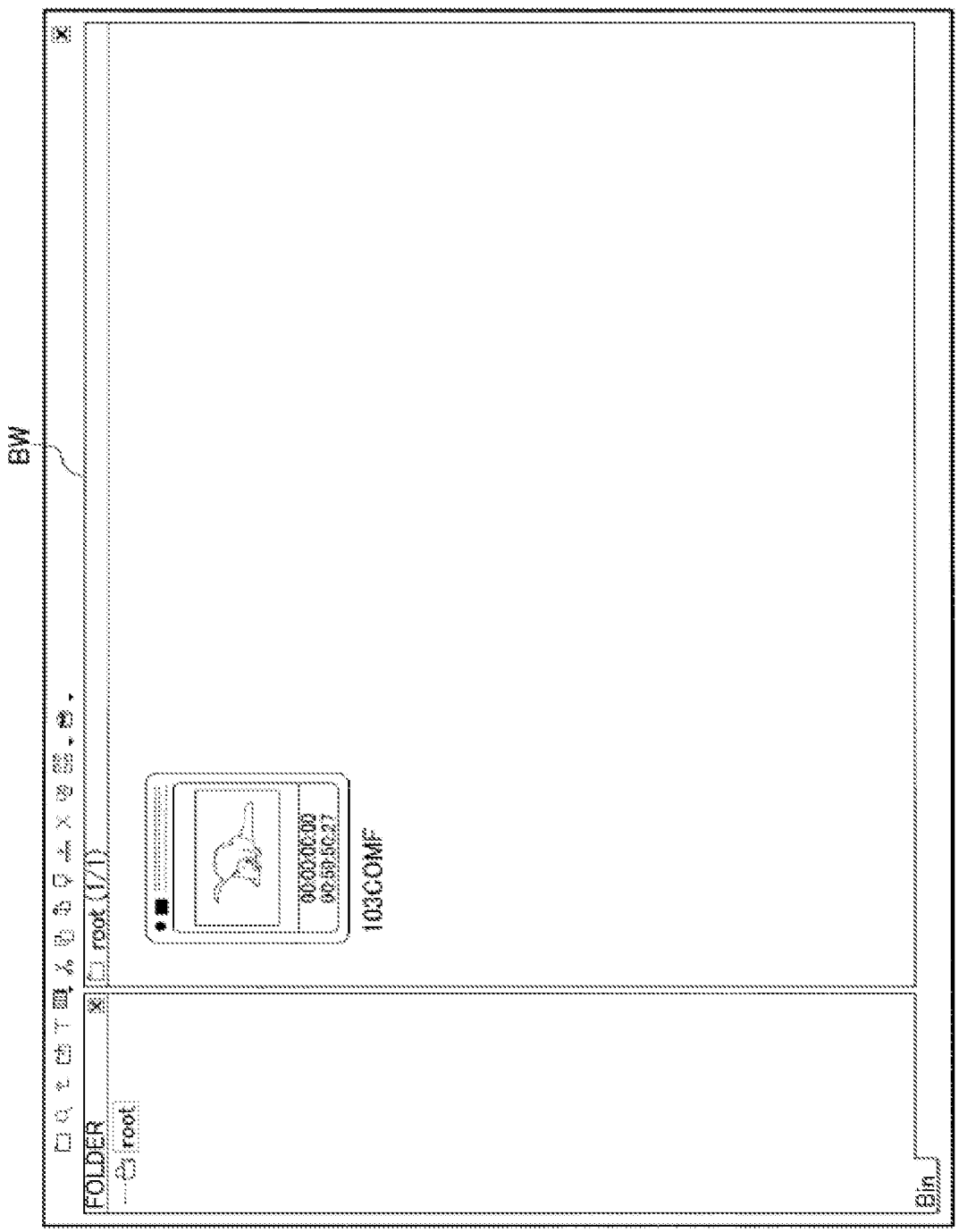
FIG. 6 shows an example of a clip display based on the generated clip information.

FIG. 6 shows an example of a clip display based on the generated clip information. With reference to FIG. 6 together with FIG. 4, one clip is displayed corresponding to the plurality of files associated with the selected index file "103COMF.IDX". In this example, a clip name "103COMF.IDX", an in point "00:00:00:00", and an out point "00:59:50:27" are displayed in the form of icon together with a thumbnail image of a cat.

(2-3) Error Processing

The CPU 102 may perform an error processing when the management data is unreadable from the access-destination resource with respect to all files associated with the selected index file.

For example, the determination unit 202 determines the number of files from which the clip obtaining unit 201 read out management data. The determination unit 202 compares the determined number and "the number of files" described in the index file, and performs the error processing when they do not match. An example of the error processing may be instructing the clip obtaining unit 201 to stop reading out the plurality of files associated with the selected index file.

The error processing based on the "total recording time" of the index file may also be possible. For example, the determination unit 202 extracts a time length of each file, i.e. a recording time, from the management data of each file read out by the clip obtaining unit 201. The determination unit 202 performs the error processing when the total time length of the read-out recording time and the total recording time described in the index file do not match.

(2-4) Generation of Clip Information for One Clip Corresponding to One File

The clip obtaining unit 201 generates clip information and sends it to the designation acceptance unit 204 when one file corresponding to one shot is selected in the file-selection window FW in FIG. 4. The clip information is generated based on management data and a thumbnail image of the file. For example, a clip obtaining unit 201 generates the clip information as follows.

A "clip name": the "filename"

An "in point": "00:00:00:00", namely, time information indicating the head of the file.

A "read-out starting point": "00:00:00:00", namely, time information indicating the head of the file.

An "out point": time information indicating a time length of the file.

A "read-out ending point": time information indicating the end of the file.

A "thumbnail image": the first frame of the file.

(3) Edit Acceptance Function (3-1) Editing Window

Figure 7:
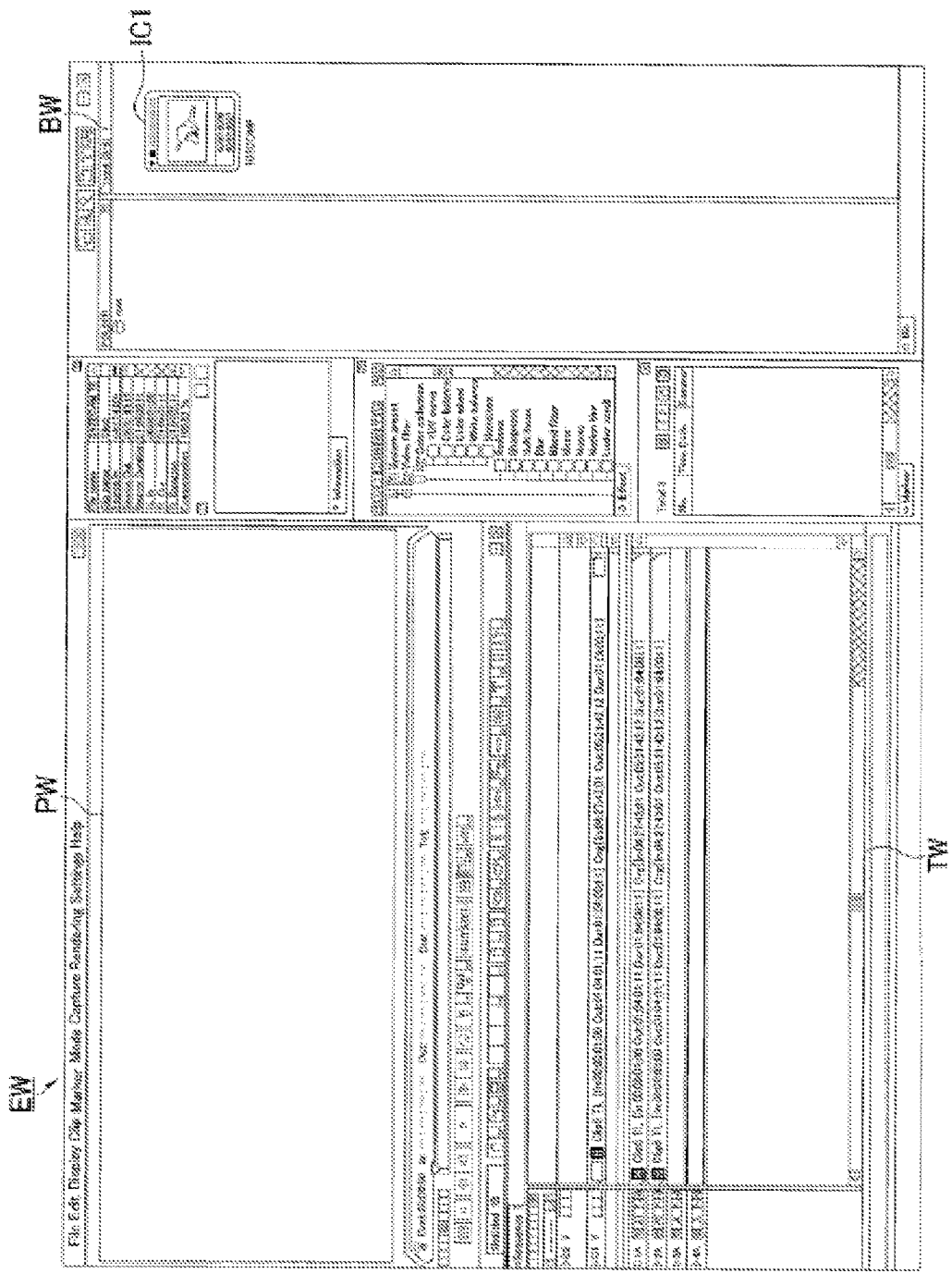
FIG. 7 shows an example of an editing window EW.

FIG. 7 shows an example of an editing window EW. With reference to FIG. 7, the editing window EW is displayed by the designation acceptance unit 204. The editing window EW accepts the designation of a clip to be edited and the adjustment of its time position. The editing window EW may include the following windows. Note that the Bin window BW in FIG. 7 is enlarged in the above-mentioned FIG. 6.

(i) Preview window PW: this window displays an image specified by a cursor positioned on a timeline. This window further displays video images corresponding to a specified part of a clip arranged on the timeline.

(ii) Timeline window TW: this window displays tracks indicating position information along a time axis (a timeline) of video contents, and accepts the arrangement of clips on each track. This window further displays time scale together with the tracks. This window further accepts the changing of an in point, out point and time length of each clip. An in point indicates a starting point of a clip on the timeline. An out point indicates an ending point of a clip on the timeline.

(iii) Bin Window BW: this window displays a clip corresponding to one or more files selected in the file-selection window FW in FIG. 4.

(3-2) Display of One Clip Corresponding to a Plurality of Files

Figure 8:
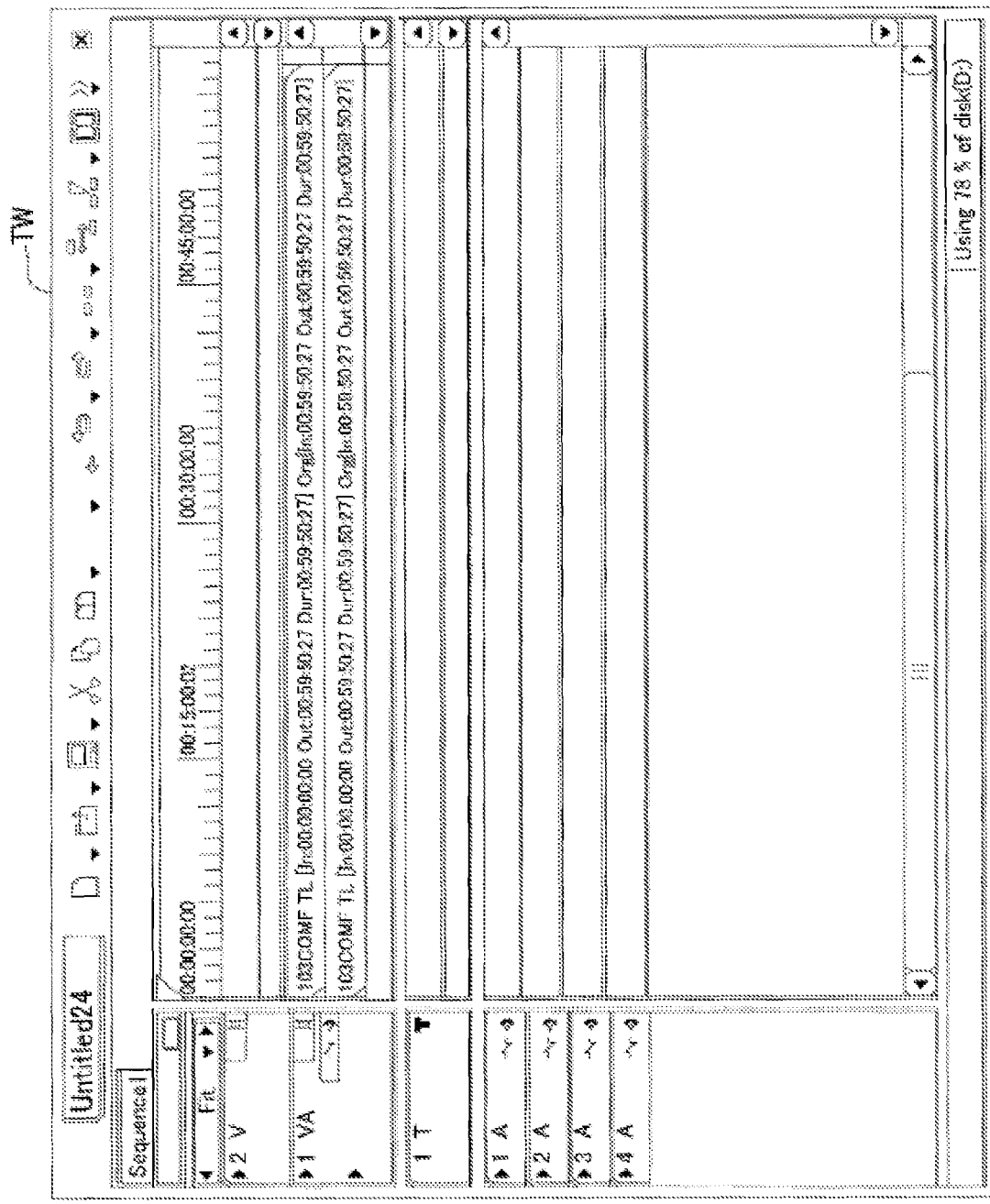
FIG. 8 is an enlarged view of the timeline window TW in FIG. 7.

FIG. 8 is an enlarged view of the timeline window TW in FIG. 7. FIG. 8 illustrates a state when a clip "103COMF" is dragged from the bin window and dropped on a track. This clip refers to the four files "COM10301.M2T", "COM10302.M2T", "COM10303.M2T" and "COM10304.M2T" displayed in the file-selection window FW in FIG. 4. The clip "103COMF" corresponding to the plurality of files is displayed based on the clip information, which is sent from the integration unit 203 to the designation acceptance unit 204. For example, the clip name "103COMF.IDX", the in point "00:00:00:00", the out point "00:59:50:27", and the time length of the clip "00:59:50:27" are displayed on the track. The time length of the clip is the difference between the in point and the out point.

When the in point, the out point, and/or the time length of the clip "103COMF" is changed, the designation acceptance unit 204 also changes a read-out starting point and a read-out ending point accordingly. As mentioned above, the read-out starting point and the read-out ending point are calculated in a form of time information along the time axis which is defined by connecting each file described in the index file.

(3-3) Decoding

The timeline window TW accepts the designation of a part of one or more clips on a track and an instruction to playback the specified part. The video image data corresponding to the specified part is displayed in a preview window PW. The integration unit 203 initializes the decoder 109 for each clip when the specified part refers to a plurality of files that are interframe coded. This is when a clip name includes an encoding format indicating MPEG4, for example. This enables to input a plurality of files into the decoder 109 in the connection order when one clip corresponds to the plurality of files that are interframe coded. In other words, the decoder 109 will not be initialized while video material stored in different files corresponding to one clip is being inputted to the decoder 109. Therefore, the reference between frames arranged in different files becomes possible. This avoids the deterioration of the images at the beginning and/or the end of files that are interframe coded.

How to specify a plurality of files corresponding to video material of one shot, a read-out starting point, and a read-out ending point when playing back one clip corresponding to the plurality of files will be explained in the editing function below.

(4) Editing Function

The editing unit 205 connects video material which the clip designated in the editing window EW refers to, and generates video contents. The video material is connected in time sequence based on the position information of the clip arranged on a timeline. The video material referred by the clip is specified by the clip name, the read-out starting point and the read-out ending point of the clip.

(4-1) Read-out of Video Material Referred by a Clip Corresponding to a Plurality of Files The editing unit 205 determines the actual filenames and time information of the files based on the read-out starting point and the read-out ending point of a clip when reading out video material referred by the clip corresponding to an index file. The filenames and the order of files may be determined based on a shot ID in the index filename and a connection number in each filename. The time information of the files is determined based on a time length of each file described in the index file which is specified by the clip name, and time information which the read-out starting point and the read-out ending point indicate.

More specifically, the read-out starting point is located in a $(n+1)^{th}$ file when the following formula is satisfied. The time information MOBs, which indicates the read-out starting point, may be determined by calculating the difference between time information Sn and time information Rs (MOBs=Rs−Sn). The time information Sn indicates the total time length from the first file to an $n^{th}$ file. The time information Rs indicates the read-out starting point.

$$MOBs = Rs - Sn$$

where
Sn<Rs<Sn+1,
Rs: time information of the read-out starting point
Sn: time information indicating the total time length from the first file to a $n^{th}$ file. (N>=1)
Sn+1: time information indicating the total length of the first file to a $(n+1)^{th}$ file
n: a connection number Likewise, time information MOBe which indicates the read-out ending point is determined based on the following formula.

$$MOBe = Re - Sn$$

where
Sn<Re<Sn+1
Rs: time information of the read-out ending point
Sn: time information indicating the total time length from the first file to a $n^{th}$ file (n>=1)
Sn+1: time information indicating the total time length from the first file to a $(n+1)^{th}$ file
n: a connection number For example, video material is read out from the head of the last file "00:00:0:00" when the read-out starting point of the clip which corresponds to the index file in FIG. 5 is "00:51:45:19". This is because the value of the time information of the read-out starting point "00:51:45:19" is bigger than that of the time information "00:51:45:18", which indicates the total time length from the first to third files. Also for example, video material is read out from the position specified by the time information "00:01:00:00" in the second file when the read-out starting point is "00:18:15:06". This is because the value of the read-out starting point "00:18:15:06" is bigger than that of the time information "00:17:15:06" indicating the time length of the first file, but smaller than that of the time information "00:34:30:12" indicating the total time length from the first to second files.

(4-2) Output of the Contents

The generated video contents are written on any storage medium such as the HDD 105 and a removable disk inserted into the drive 101. The editing unit 205 may transmit the generated video contents to a database or an information terminal connected via the communication interface 106. The editing unit 205 may further output the generated video contents to the output device 300 and/or an external device via the AV unit 110.

<<Processes Excused by the Editing Apparatus>>

The CPU 102 in the editing apparatus 100 executes an editing process and a decoding process. An explanation of the processes will be given below.

(1) An Editing Process

Figure 9:
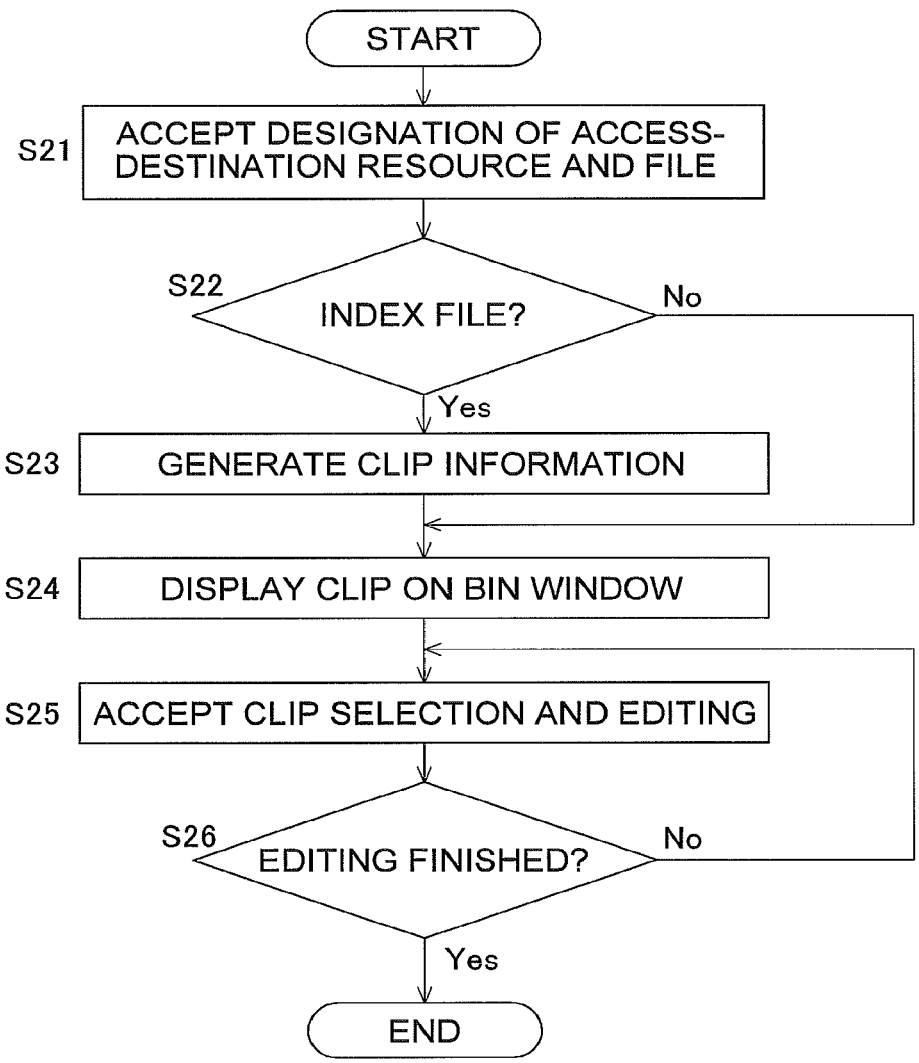
FIG. 9 is a flow chart showing an embodiment of the editing process executed by the editing apparatus in FIG. 2.

FIG. 9 is a flow chart showing an embodiment of the editing process. An explanation of the editing process will be given with reference to FIG. 9.

Step S21: The CPU 102 accepts the selection of one or more files which are to be video material. In other words, the CPU 102 accepts the designation of an access-destination resource, and accepts the selection of one or more files stored on the resource. The selected files are read out and recorded on the HDD 105.

Step S22: The CPU 102 determines whether or not an index file is included among the selected files. With respect to files other than the index file, the CPU 102 generates clip information of each file based on management data thereof. When an index file is included in the selected files, the process then proceeds to step S23.

Step S23: The CPU 102 generates clip information for the index file. Specifically, the clip information is generated based on a time length of each file described in the index file and/or a shot ID indicated by the filename of the index file.

Step S24: The CPU 102 displays one or more clips in the Bin window BW based on the clip information, and accepts the selection of one or more clips which are to be arranged on a timeline.

Step S25 to S26: The CPU 102 accepts the operation for arrangement of clips onto the timeline and for editing the clips until it receives an instruction to stop editing.

This process enables to arrange one clip on the timeline, which refers to video data for one shot divided into and recorded in a plurality of files, and to edit the clip.

(2) Decoding Process

Figure 10:
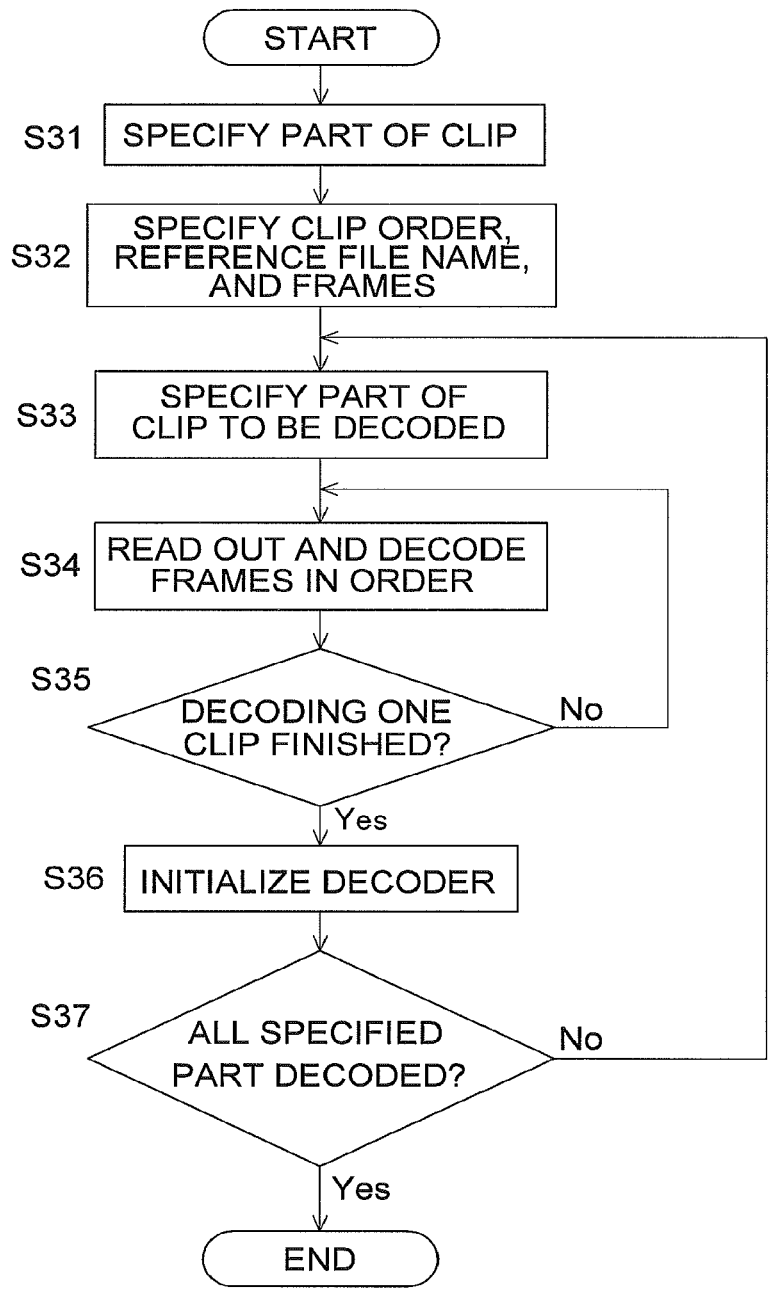
FIG. 10 is a flow chart showing an embodiment of the decoding process executed by the editing apparatus in FIG. 2.

FIG. 10 is a flow chart showing an embodiment of the decoding process. With reference to FIG. 10, the decoding process is initiated by an instruction of playback during the editing of a clip that is referring to interframe-coded video material. Whether or not the video material is interframe coded may be determined, for example, based on the encoding format indicated by a filename of the video material.

Step S31: The CPU 102 obtains a specified part of one or more clips.

Step S32: The CPU 102 specifies video material and its generation order which the specified part of the clips refers to. More specifically, the CPU 102 specifies the order in which each clip is arranged, one or more filenames corresponding to each clip, the time information indicating the read-out starting address and the read-out ending address of each file. "Frame" in FIG. 10 indicates the time information. One frame corresponds to 1/30 seconds.

Step S33: The CPU 102 defines a clip as a current clip to be decoded in order starting from the first clip among the specified part of clips.

Step S34 to S35: The CPU 102 reads out from the HDD 105 all frames of the video material referred by the current clip in order, and inputs the frames into the decoder 109. The frames in a plurality of files are arranged and inputted into the decoder 109 in the order of connection number indicated by the filenames when the current clip refers to the plurality of files. The video data decoded by the decoder 109 is displayed on the preview window PW.

Step S36: The CPU 102 initializes the decoder 109 when the decoding of the current clip is finished.

Step S37: The CPU 102 determines whether or not all of the specified part of clips is decoded. If not, the process then returns to the step S34, and the CPU 102 decodes and playbacks the next clip. This process will end when the decoding of the specified part of clips is completed.

This process enables the reference between frames arranged in different files when decoding. This prevents the deterioration of images at the beginning or at the end of the files when one shot is recorded in the files that are interframe coded.

Figure 11A:
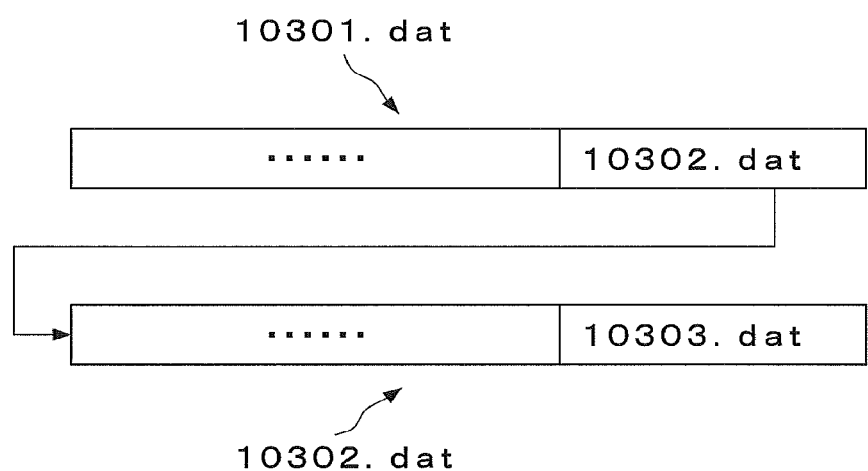
FIG. 11A shows a method of associating a plurality of files by writing into each file a filename of the next file thereof.
Figure 11B:
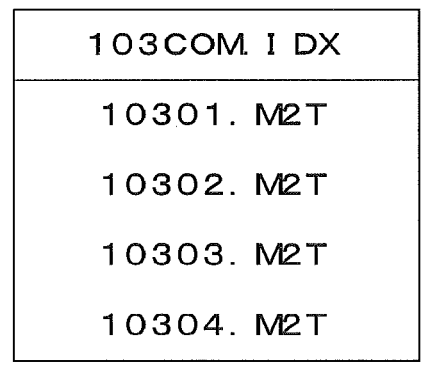
FIG. 11B shows another method of associating a plurality of files with each other and defining the order of the files by an index file.

Other Embodiment (A) FIG. 11A and FIG. 11B show explanatory views of other methods associating a plurality of files with each other in the order of recording when one shot is divided into and recorded in the plurality of files. FIG. 11A shows a method of associating a plurality of files by writing into each file a filename of the next file thereof. FIG. 11A shows two files and description contents in each file. FIG. 11B shows another method of associating a plurality of files with each other and defining the order of the files by an index file. An index file and description contents therein are illustrated in FIG. 11B.

With reference to FIG. 11A, a current file whose filename is "10301.dat" includes video material such as video data and audio data, and a filename "10302.dat". The filename "10302.dat" indicates a file generated sequentially after the current file. The file whose filename is "10302.dat" includes video material and a filename "10303.dat" of a file which was generated sequentially after this file. Reading out the filename of the next file written in each file enables to associate a plurality of files with each other in the order of recording without an index file.

With reference to FIG. 11B, the index file "103COM.IDX" describes filenames of files in the order of recording which multimedia data corresponding to one shot is written therein. Reading out the filenames described in the index file and its order enables to associate the plurality of files with each other in the order of recording.

Various methods may be adopted in order to associate a plurality of files corresponding to one shot with each other. The data on which clip information is generated based, the way of specifying a reading-out starting point and/or a reading-out ending point of multimedia data may depend on the methods, and they may be modified within the scope of the essence of the present invention.

(B) The present invention encompasses a program for causing a computer to execute the method discussed above, as well as a computer readable storage medium on which such a program is recorded. Examples of storage medium include a computer readable/writable flexible disk, a hard disk, a CD-ROM, a MO, a DVD, a DVD-ROM, a DVD-RAM, a Blu-Ray Disc, and a semiconductor memory.

The computer program is not limited to the one recorded on the storage medium, and may be downloadable by a network such as an electric communication line, a wireless/wired communication line and the Internet.

INDUSTRIAL APPLICABILITY

The present invention is applicable to an editing apparatus for editing video data and/or audio data.

The invention claimed is:

1. A hardware editing apparatus comprising:
   an integration unit for arranging a plurality of files corresponding to a clip in a generation order based on management data for an index file for the clip and for integrating the plurality of files so as to enable a user to edit the integrated plurality of files as a single file;
   a user interface for receiving a user selection of the clip stored as a plurality of files and for presenting the plurality of files to the user as a single virtual clip in an editing window in response to the user selection of the clip;
   a decoder for decoding the plurality of files provided in the determined order, prior to editing a specified part of the clip, wherein the decoder is initialized by the integration unit when the specified part refers to a plurality of files that are interframe coded such that the decoder does not initiate decoding until video data for each of the plurality of files is input to the decoder; and
   an editing unit for editing the plurality of files as the single clip.

2. The hardware editing apparatus of claim 1, wherein the decoder is configured to decode the plurality of files prior to editing a specified part of the clip.

3. The hardware editing apparatus of claim 1, wherein the plurality of files correspond to one shot.

4. The hardware editing apparatus of claim 1, further comprising:
   a clip obtaining unit for obtaining the clip stored as the plurality of files.

5. The hardware editing apparatus of claim 4, wherein the clip includes clip information, including clip name, in point, out point, read out starting point, read out ending point, and a thumbnail image, and a file name that includes a shot identifier and a connection number.

6. The hardware editing apparatus of claim 1, further comprising a reception unit for displaying the integrated files as one clip and to accept editing of the clip.

7. The hardware editing apparatus of claim 1, further comprising:
a determination unit for determining a generation order in time sequence of each of the plurality of files, the plurality of files including encoded interframe data.

8. The hardware editing apparatus of claim 7, wherein the determination unit determines the generation order based on each filename of the plurality of files.

9. The hardware editing apparatus of claim 7, wherein the determination unit obtains information indicating a total number or a total recording time of the plurality of files, and the integration unit integrates the plurality of files when the obtained information meets the determination result made by the determination unit.

10. The hardware editing apparatus of claim 1, wherein the user interface further presents an editing window that accepts the designation of the clip to be edited and an adjustment of its time position.

11. An editing method comprising the steps of:
integrating a plurality of files by arranging the plurality of files corresponding to a clip in a generation order based on management data for an index file for the clip and for integrating the plurality of files so as to enable a user to edit the integrated plurality of files as a single file;
presenting a user interface for receiving a user selection of the clip stored as a plurality of files and for presenting the plurality of files to the user as a single virtual clip in an editing window in response to the user selection of the clip;
decoding the plurality of files provided in the determined order, prior to editing a specified part of the clip, wherein the decoder is initialized by the integration unit when the specified part refers to a plurality of files that are interframe coded such that the decoder does not initiate decoding until video data for each of the plurality of files is input to the decoder; and
editing the plurality of files as the single clip.

12. The editing method of claim 11, wherein the plurality of files are decoded prior to editing a specified part of the clip.

13. The editing method of claim 11, further comprising:
determining a generation order in time sequence of each of the plurality of files, the plurality of files including encoded interframe data.

14. The editing method of claim 13, wherein the determination includes determining the generation order based on each filename of the plurality of files.

15. The editing method of claim 13, wherein the determination includes obtaining information indicating a total number or a total recording time of the plurality of files, and the integration unit integrates the plurality of files when the obtained information meets the determination result made by the determination unit.

16. A non-transitory computer readable medium on which is recorded an editing program for causing a computer to execute:
integrating a plurality of files by arranging the plurality of files corresponding to a clip in a generation order based on management data for an index file for the clip and for integrating the plurality of files so as to enable a user to edit the integrated plurality of files as a single file;
presenting a user interface for receiving a user selection of the clip stored as a plurality of files and for presenting the plurality of files to the user as a single virtual clip in an editing window in response to the user selection of the clip;
decoding the plurality of files provided in the determined order, prior to editing a specified part of the clip, wherein the decoder is initialized by the integration unit when the specified part refers to a plurality of files that are interframe coded such that the decoder does not initiate decoding until video data for each of the plurality of files is input to the decoder; and
editing the plurality of files as the single clip.

17. The computer readable medium of claim 16, wherein the plurality of files are decoded prior to editing a specified part of the clip.

18. The computer readable medium of claim 16, further comprising code for causing a computer to execute:
determining a generation order in time sequence of each of the plurality of files, the plurality of files including encoded interframe data.

19. The computer readable medium of claim 18, wherein the determination includes determining the generation order based on each filename of the plurality of files.

20. The computer readable medium of claim 18, wherein the determination includes obtaining information indicating a total number or a total recording time of the plurality of files, and the integration unit integrates the plurality of files when the obtained information meets the determination result made by the determination unit.

* * * * *